(12) United States Patent
Tzoukermann et al.

(10) Patent No.: US 9,442,933 B2
(45) Date of Patent: Sep. 13, 2016

(54) IDENTIFICATION OF SEGMENTS WITHIN AUDIO, VIDEO, AND MULTIMEDIA ITEMS

(75) Inventors: Evelyne Tzoukermann, Silver Spring, MD (US); Leslie Eugene Chipman, Rockville, MD (US); Anthony R. Davis, Silver Spring, MD (US); David F. Houghton, Brattleboro, VT (US); Ryan M. Farrell, College Park, MD (US); Hongzhong Zhou, Silver Spring, MD (US); Oliver Jojic, Annandale, VA (US); Vladimir Kronrod, Rockville, MD (US); Bageshree Shevade, Alexandria, VA (US); Geetu Ambwani, Washington, DC (US)

(73) Assignee: Comcast Interactive Media, LLC, Philadelphia, PA (US)

( * ) Notice: Subject to any disclaimer, the term of this patent is extended or adjusted under 35 U.S.C. 154(b) by 568 days.

(21) Appl. No.: 12/343,779

(22) Filed: Dec. 24, 2008

(65) Prior Publication Data
US 2010/0158470 A1    Jun. 24, 2010

(51) Int. Cl.
*H04N 9/80* (2006.01)
*G06F 17/30* (2006.01)

(52) U.S. Cl.
CPC ................... *G06F 17/30038* (2013.01)

(58) Field of Classification Search
USPC ................... 386/239–262, 278–290
See application file for complete search history.

(56) References Cited

U.S. PATENT DOCUMENTS

| | | | |
|---|---|---|---|
| 4,227,177 A | 10/1980 | Moshier | |
| 5,493,677 A | 2/1996 | Balogh et al. | |
| 5,521,841 A | 5/1996 | Arman et al. | |
| 5,530,859 A | 6/1996 | Tobias, II et al. | |
| 5,535,063 A | 7/1996 | Lamming | |
| 5,553,281 A | 9/1996 | Brown et al. | |
| 5,576,755 A | 11/1996 | Davis et al. | |
| 5,594,897 A | 1/1997 | Goffman | |
| 5,640,553 A | 6/1997 | Schultz | |
| 5,649,182 A | 7/1997 | Reitz | |
| 5,666,528 A | 9/1997 | Thai | |
| 5,682,326 A | 10/1997 | Klingler et al. | |
| 5,717,914 A | 2/1998 | Husick et al. | |
| 5,729,741 A | 3/1998 | Liaguno et al. | |
| 5,737,495 A | 4/1998 | Adams et al. | |

(Continued)

FOREIGN PATENT DOCUMENTS

| | | |
|---|---|---|
| CA | 2688921 | 12/2009 |
| CA | 2689376 | 12/2009 |

(Continued)

OTHER PUBLICATIONS

EP Application No. 09 179 987.4-1241—Office Action mailed Feb. 15, 2011.

(Continued)

*Primary Examiner* — Hung Dang
(74) *Attorney, Agent, or Firm* — Banner & Witcoff, Ltd.

(57) ABSTRACT

The invention pertains to methods, systems, and apparatus for identifying segments within a media item, the media segment including at least one of audio content and video content, comprising segmenting the media item into a plurality of segments as a function of subject matter, storing data identifying each segment and its subject matter, and organizing each segment within an ontology based on its subject matter.

23 Claims, 3 Drawing Sheets

(56) References Cited

U.S. PATENT DOCUMENTS

| | | |
|---|---|---|
| 5,737,734 A | 4/1998 | Schultz |
| 5,742,816 A | 4/1998 | Barr et al. |
| 5,761,655 A | 6/1998 | Hoffman |
| 5,765,150 A | 6/1998 | Burrows |
| 5,799,315 A | 8/1998 | Rainey et al. |
| 5,819,292 A | 10/1998 | Hitz et al. |
| 5,845,279 A | 12/1998 | Garofalakis et al. |
| 5,857,200 A | 1/1999 | Togawa |
| 5,924,090 A | 7/1999 | Krellenstein |
| 5,928,330 A | 7/1999 | Goetz et al. |
| 5,937,422 A | 8/1999 | Nelson et al. |
| 5,956,729 A | 9/1999 | Goetz et al. |
| 5,982,369 A | 11/1999 | Sciammarella et al. |
| 6,038,560 A | 3/2000 | Wical |
| 6,052,657 A | 4/2000 | Yamron et al. |
| 6,055,543 A | 4/2000 | Christensen et al. |
| 6,058,392 A | 5/2000 | Sampson et al. |
| 6,167,377 A | 12/2000 | Gillick et al. |
| 6,188,976 B1 | 2/2001 | Ramaswamy et al. |
| 6,278,992 B1 | 8/2001 | Curtis et al. |
| 6,320,588 B1 | 11/2001 | Palmer et al. |
| 6,345,253 B1 | 2/2002 | Viswanathan |
| 6,363,380 B1* | 3/2002 | Dimitrova .................. 707/740 |
| 6,366,296 B1 | 4/2002 | Boreczky et al. |
| 6,374,260 B1 | 4/2002 | Hoffert et al. |
| 6,415,434 B1 | 7/2002 | Kind |
| 6,418,431 B1 | 7/2002 | Mahajan et al. |
| 6,463,444 B1 | 10/2002 | Jain et al. |
| 6,545,209 B1 | 4/2003 | Flannery et al. |
| 6,546,385 B1 | 4/2003 | Mao et al. |
| 6,567,980 B1 | 5/2003 | Jain et al. |
| 6,675,174 B1 | 1/2004 | Bolle et al. |
| 6,698,020 B1 | 2/2004 | Zigmond et al. |
| 6,771,875 B1 | 8/2004 | Kunieda et al. |
| 6,789,088 B1 | 9/2004 | Lee et al. |
| 6,792,426 B2 | 9/2004 | Baumeister et al. |
| 6,877,134 B1 | 4/2005 | Fuller et al. |
| 6,882,793 B1 | 4/2005 | Fu et al. |
| 6,901,364 B2 | 5/2005 | Nguyen et al. |
| 6,937,766 B1 | 8/2005 | Wilf et al. |
| 6,970,639 B1* | 11/2005 | McGrath et al. ............ 386/290 |
| 7,206,303 B2 | 4/2007 | Karas et al. |
| 7,272,558 B1 | 9/2007 | Soucy et al. |
| 7,376,642 B2 | 5/2008 | Nayak et al. |
| 7,472,137 B2 | 12/2008 | Edelstein et al. |
| 7,490,092 B2 | 2/2009 | Sibley et al. |
| 7,548,934 B1 | 6/2009 | Platt et al. |
| 7,584,102 B2 | 9/2009 | Hwang et al. |
| 7,739,286 B2 | 6/2010 | Sethy et al. |
| 7,788,266 B2 | 8/2010 | Venkataraman et al. |
| 7,792,812 B1 | 9/2010 | Carr |
| 7,814,267 B1 | 10/2010 | Iyengar et al. |
| 7,921,116 B2 | 4/2011 | Finkelstein et al. |
| 7,925,506 B2 | 4/2011 | Farmaner et al. |
| 7,958,119 B2 | 6/2011 | Eggink et al. |
| 7,983,902 B2 | 7/2011 | Wu et al. |
| 8,041,566 B2 | 10/2011 | Peters et al. |
| 8,078,467 B2 | 12/2011 | Wu et al. |
| 8,117,206 B2 | 2/2012 | Sibley et al. |
| 8,265,933 B2 | 9/2012 | Bates et al. |
| 8,527,520 B2 | 9/2013 | Morton et al. |
| 8,572,087 B1 | 10/2013 | Yagnik |
| 2001/0014891 A1 | 8/2001 | Hoffert et al. |
| 2002/0035573 A1 | 3/2002 | Black et al. |
| 2002/0087315 A1 | 7/2002 | Lee et al. |
| 2002/0143774 A1 | 10/2002 | Vandersluis |
| 2002/0194181 A1 | 12/2002 | Wachtel |
| 2003/0014758 A1 | 1/2003 | Kim |
| 2003/0033297 A1 | 2/2003 | Ogawa |
| 2003/0050778 A1 | 3/2003 | Nguyen et al. |
| 2003/0061028 A1 | 3/2003 | Dey et al. |
| 2003/0093790 A1* | 5/2003 | Logan et al. .................. 725/38 |
| 2003/0135582 A1 | 7/2003 | Allen et al. |
| 2003/0163443 A1 | 8/2003 | Wang |
| 2003/0163815 A1 | 8/2003 | Begeja et al. |
| 2003/0195877 A1 | 10/2003 | Ford et al. |
| 2003/0204513 A1 | 10/2003 | Bumbulis |
| 2004/0111465 A1 | 6/2004 | Chuang et al. |
| 2004/0117831 A1 | 6/2004 | Ellis et al. |
| 2004/0139091 A1 | 7/2004 | Shin |
| 2004/0215634 A1 | 10/2004 | Wakefield et al. |
| 2004/0225667 A1 | 11/2004 | Hu et al. |
| 2004/0243539 A1 | 12/2004 | Skurtovich et al. |
| 2004/0254795 A1 | 12/2004 | Fujii et al. |
| 2004/0267700 A1 | 12/2004 | Dumais et al. |
| 2005/0044105 A1 | 2/2005 | Terrell |
| 2005/0060647 A1 | 3/2005 | Doan et al. |
| 2005/0091443 A1 | 4/2005 | Hershkovich et al. |
| 2005/0097138 A1 | 5/2005 | Kaiser et al. |
| 2005/0114130 A1 | 5/2005 | Java et al. |
| 2005/0152362 A1 | 7/2005 | Wu |
| 2005/0193005 A1 | 9/2005 | Gates et al. |
| 2005/0222975 A1 | 10/2005 | Nayak et al. |
| 2006/0037046 A1 | 2/2006 | Simms et al. |
| 2006/0074671 A1 | 4/2006 | Farmaner et al. |
| 2006/0088276 A1 | 4/2006 | Cho et al. |
| 2006/0100898 A1 | 5/2006 | Pearce et al. |
| 2006/0112097 A1 | 5/2006 | Callaghan et al. |
| 2006/0156399 A1 | 7/2006 | Parmar et al. |
| 2006/0161546 A1 | 7/2006 | Callaghan et al. |
| 2006/0167859 A1 | 7/2006 | Verbeck Sibley et al. |
| 2006/0212288 A1 | 9/2006 | Sethy et al. |
| 2006/0235843 A1 | 10/2006 | Musgrove et al. |
| 2006/0253780 A1 | 11/2006 | Munetsugu et al. |
| 2006/0256739 A1 | 11/2006 | Seier et al. |
| 2007/0011133 A1 | 1/2007 | Chang |
| 2007/0050343 A1 | 3/2007 | Siddarammappa et al. |
| 2007/0050366 A1 | 3/2007 | Bugir et al. |
| 2007/0067285 A1 | 3/2007 | Blume et al. |
| 2007/0078708 A1 | 4/2007 | Yu et al. |
| 2007/0083374 A1 | 4/2007 | Bates et al. |
| 2007/0156677 A1 | 7/2007 | Szabo |
| 2007/0208567 A1 | 9/2007 | Amento et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0233487 A1 | 10/2007 | Cohen et al. |
| 2007/0233656 A1 | 10/2007 | Bunescu et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0271086 A1 | 11/2007 | Peters et al. |
| 2008/0033915 A1 | 2/2008 | Chen et al. |
| 2008/0046929 A1 | 2/2008 | Cho et al. |
| 2008/0059418 A1 | 3/2008 | Barsness et al. |
| 2008/0091633 A1 | 4/2008 | Rappaport et al. |
| 2008/0113504 A1 | 5/2008 | Lee et al. |
| 2008/0118153 A1* | 5/2008 | Wu et al. .................. 382/190 |
| 2008/0133504 A1 | 6/2008 | Messer et al. |
| 2008/0162533 A1 | 7/2008 | Mount et al. |
| 2008/0163328 A1 | 7/2008 | Philbin et al. |
| 2008/0168045 A1 | 7/2008 | Suponau et al. |
| 2008/0183681 A1 | 7/2008 | Messer et al. |
| 2008/0183698 A1 | 7/2008 | Messer et al. |
| 2008/0189110 A1 | 8/2008 | Freeman et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0208864 A1 | 8/2008 | Cucerzan et al. |
| 2008/0221989 A1 | 9/2008 | Messer et al. |
| 2008/0222105 A1 | 9/2008 | Matheny |
| 2008/0222106 A1 | 9/2008 | Rao et al. |
| 2008/0222142 A1 | 9/2008 | O'Donnell |
| 2008/0235209 A1 | 9/2008 | Rathod et al. |
| 2008/0235393 A1 | 9/2008 | Kunjithapatham et al. |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0281801 A1 | 11/2008 | Larson et al. |
| 2008/0288641 A1 | 11/2008 | Messer et al. |
| 2008/0319962 A1 | 12/2008 | Riezler et al. |
| 2009/0006315 A1 | 1/2009 | Mukherjea et al. |
| 2009/0006391 A1 | 1/2009 | Ram |
| 2009/0013002 A1 | 1/2009 | Eggink et al. |

(56) References Cited

U.S. PATENT DOCUMENTS

| | | |
|---|---|---|
| 2009/0025054 A1 | 1/2009 | Gibbs et al. |
| 2009/0055381 A1 | 2/2009 | Wu et al. |
| 2009/0077078 A1 | 3/2009 | Uppala et al. |
| 2009/0083257 A1 | 3/2009 | Bargeron et al. |
| 2009/0094113 A1 | 4/2009 | Berry et al. |
| 2009/0123021 A1 | 5/2009 | Jung et al. |
| 2009/0144260 A1 | 6/2009 | Bennett et al. |
| 2009/0144609 A1 | 6/2009 | Liang et al. |
| 2009/0157680 A1 | 6/2009 | Crossley et al. |
| 2009/0172544 A1 | 7/2009 | Tsui et al. |
| 2009/0198686 A1 | 8/2009 | Cushman, II et al. |
| 2009/0204599 A1 | 8/2009 | Morris et al. |
| 2009/0205018 A1 | 8/2009 | Ferraiolo et al. |
| 2009/0240650 A1 | 9/2009 | Wang et al. |
| 2009/0240674 A1 | 9/2009 | Wilde et al. |
| 2009/0271195 A1 | 10/2009 | Kitade et al. |
| 2009/0282069 A1 | 11/2009 | Callaghan et al. |
| 2009/0326947 A1 | 12/2009 | Arnold et al. |
| 2010/0042602 A1 | 2/2010 | Smyros et al. |
| 2010/0070507 A1 | 3/2010 | Mori |
| 2010/0094845 A1 | 4/2010 | Moon et al. |
| 2010/0138653 A1 | 6/2010 | Spencer et al. |
| 2010/0250598 A1 | 9/2010 | Brauer et al. |
| 2011/0004462 A1 | 1/2011 | Houghton et al. |
| 2011/0016106 A1 | 1/2011 | Xia |
| 2011/0077943 A1 | 3/2011 | Miki et al. |
| 2011/0125728 A1 | 5/2011 | Smyros et al. |
| 2011/0191099 A1 | 8/2011 | Farmaner et al. |
| 2011/0246503 A1 | 10/2011 | Bender et al. |
| 2012/0036119 A1 | 2/2012 | Zwicky et al. |
| 2012/0078932 A1 | 3/2012 | Skurtovich, Jr. et al. |
| 2012/0150636 A1 | 6/2012 | Freeman et al. |
| 2012/0191695 A1 | 7/2012 | Xia |
| 2013/0054589 A1 | 2/2013 | Cheslow |

FOREIGN PATENT DOCUMENTS

| | | |
|---|---|---|
| CA | 2694943 | 2/2010 |
| CA | 2695709 | 3/2010 |
| CA | 2697565 | 4/2010 |
| CA | 2685833 A1 | 5/2010 |
| CA | 2703569 | 5/2010 |
| CA | 2708842 | 6/2010 |
| EP | 1241587 A1 | 9/2002 |
| EP | 1950739.1 | 2/2003 |
| EP | 1462950 A1 | 9/2004 |
| EP | 1501305 A1 | 1/2005 |
| EP | 9180762.8 | 12/2009 |
| EP | 9180776.8 | 12/2009 |
| EP | 10154725.5 | 2/2010 |
| EP | 09815446.1 | 3/2010 |
| EP | 10155340.2 | 3/2010 |
| EP | 10162666.1 | 5/2010 |
| EP | 10167947 | 6/2010 |
| GB | 244875 A | 12/1925 |
| GB | 2 448 875 A | 11/2008 |
| GB | 2448874 A | 11/2008 |
| GB | 2448875 A | 11/2008 |
| WO | 9950830 A1 | 10/1999 |
| WO | 0205135 A2 | 1/2002 |
| WO | 2005/050621 A2 | 6/2005 |
| WO | 2006099621 A2 | 9/2006 |
| WO | 2007115224 A2 | 10/2007 |
| WO | 2008053132 A1 | 5/2008 |
| WO | 2009052277 A1 | 4/2009 |

OTHER PUBLICATIONS

Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.

Changsheng Xu et al., "Using Webcast Text for Semantic Event Detection in Broadcast Sports Video", IEEE Transactions on Multimedia, vol. 10, No. 7, pp. 1342-1355, Nov. 2008.

Liang Bai et al., "Video Semantic Content Analysis based on Ontology", International Machine Vision and Image Processing Conference, pp. 117-124, Sep. 2007.

Koskela M. et al., "Measuring Concept Similarities in Multimedia Ontologies: Analysis and Evaluations", IEEE Transactions on Multimedia, vol. 9, No. 5, pp. 912-922, Aug. 2007.

Steffen Staab et al., "Semantic Multimedia", Reasoning Web; Lecture Notes in Computer Science, pp. 125-170, Sep. 2008.

European Search Report dated Jun. 4, 2010.

European Search Report for Application No. 09180776.8, mailed Jun. 7, 2010, 9 pages.

European Search Report dated Mar. 22, 2010.

European Application No. 09175979.5—Office Action mailed Mar. 15, 2010.

EP Application No. 09 175 979.5—Office Action mailed Apr. 11, 2011.

Kontothoanassis, Ledonias et al. "Design, Implementation, and Analysis of a Multimedia Indexing and Delivery Server", Technical Report Series, Aug. 1999, Cambridge Research Laboratory.

U.S. Appl. No. 12/343,790—Office Action dated May 23, 2011.

Li, Y. et al., "Reliable Video Clock Time Recognition," Pattern Recognition, 2006, 1CPR 1006, 18th International Conference on Pattern Recognition, 4 pages.

Salton et al., Computer Evaluation of Indexing and Text Processing Journal of the Association for Computing Machinery, vol. 15, No. 1, Jan. 1968, pp. 8-36.

Smith, J.R. et al. "An Image and Video Search Engine for the World-Wide Web" Storage and Retrieval for Image and Video Databases 5, San Jose, Feb. 13-14, 1997, Proceedings of Spie, Belingham, Spie, US, vol. 3022, Feb. 13, 1997, pp. 84-95.

Extended European Search Report—EP 09815446.1—mailing date: May 7, 2013.

Canadian Patent Application No. 2,685,833—Office Action dated Jan. 20, 2012.

IPER PCT/US2009/069644—Jun. 29, 2011.

ISR PCT/US2009/069644—Mar. 4, 2010.

ESR—EP10154725.5—Nov. 2, 2010.

ESR—EP10155340.2—Nov. 25, 2010.

Partial ESR—EP10155340.2—Jul. 12, 2010.

ESR—EP10162666.1—Aug. 4, 2011.

ESR—EP10167947.0—Sep. 28, 2010.

ISR PCT/US2001/020894—Nov. 25, 2003.

European Patent Application No. 09175979.5—Office Action dated Dec. 13, 2011.

Shahraray: "Impact and Applications of Video Content Analysis and Coding in the internet and Telecommunications", AT&T Labs Research, A Position Statement for Panel 4: Applications the 1998 International Workshop on Very Low Bitrate Video Coding, 3 pages.

Kalina Bontcheva et al "Shallow Methods for Named Entity Coreference Resolution", Proc. of Taln 2002, Jan. 1, 2002.

Raphael Volz et al., "Towards ontologybased disambiguation of geographical identifiers", Proceedings of the WWW2007 Workshop I3: Identity, Identifiers, Identification, Entity-Centric Approaches to Information and Knowledge Management on the Web, Jan. 1, 2007.

Wacholder N et al., "Disambiguation of Proper Names in Text", Proceedings of the Conference on Applied Natural Language Processing, Association Computer Linguistics, Morrisontown, NJ, Mar. 1, 2007.

European Search Report EP 09180762, dated Mar. 22, 2010.

Smith, J.R. et al., "An Image and Video Search Engine for the World-Wide Web" Storage and Retrieval for Image and Video Databases 5, San Jose, Feb. 13-14, 1997, Proceedings of Spie, Belingham, Spie, US, vol. 3022, Feb. 13, 1997, pp. 84-95.

International Preliminary Examination Report for PCT/US01/20894, dated Feb. 4, 2002.

Towards a Multimedia World-Wide Web Information retrieval engines, Sougata Mukherjea, Kyoji Hirata, and Yoshinori Hara Computer Networks and ISDN Systems 29 (1997) 1181-1191.

(56) References Cited

OTHER PUBLICATIONS

Experiments in Spoken Document Retrieval at CMU, M.A. Siegler, M.J. Wittbrock, S.T. Slattery, K. Seymore, R.E. Jones, and A.G. Hauptmann, School of Computer Science Carnegie Mellon University, Pittsburgh, PA 15213-3890, Justsystem Pittsburgh Research Center, 4616 Henry Street, Pittsburgh, PA 15213.
Eberman, et al., "Indexing Multimedia for the Internet", Compaq, Cambridge Research laboratory, Mar. 1999, pp. 1-8 and Abstract.
Ishitani, et al., "Logical Structure Analysis of Document Images Based on Emergent Computation", IEEE Publication, pp. 189-192, Jul. 1999.
First Office Action in EP01950739.1-1244 dated Mar. 27, 2009.
Chen, "Extraction of Indicative Summary Sentences from Imaged Documents", IEEE publication, 1997, pp. 227-232.
Messer, Alan et al., "SeeNSearch: A Context Directed Search Facilitator for Home Entertainment Devices", Paper, Samsung Information Systems America Inc., San Jose, CA.
Hsin-Min Wang and Berlin Chen, "Content-based Language Models for Spoken Document Retrieval", ACM, 2000, pp. 149-155.
Marin, Feldman, Ostendorf and Gupta, "Filtering Web Text to Match Target Genres", International Conference on Acoustics, Speech and Signal Processing, 2009, Piscataway, NJ, Apr. 19, 2009, pp. 3705-3708.
European Search Report for application No. 10167947.0, mailed Sep. 28, 2010.
"Ying Zhang and Phil Vines. 2004. Using the web for automated translation extraction in cross-language information retrieval. In Proceedings of the 27th annual international ACM SIGIR conference on Research and development in information retrieval (SIGIR '04). ACM, New York, NY, USA, 162-169".
European Office Action—EP 10154725.5—Dated Apr. 24, 2015.
Canadian Office Action—CA Application 2,697,565—dated Dec. 15, 2015.
Behrang Mohit and Rebecca Hwa, 2005. Syntax-based Semi-Supervised Named Entity Tagging. In Proceedings of the ACL Interactive Poster and Demonstration Sessions, pp. 57-60.
Shumeet Baluja, Vibhu Mittal and Rahul Sukthankar, 1999. Applying machine learning for high performance named-entity extraction. In Proceedings of Pacific Association for Computational Linguistics.
R. Bunescu and M. Pasca. 2006. Using encyclopedic knowledge for named entity disambiguation. In Proceedings of EACL-2006, pp. 9-16.
S. Cucerzan. 2007. Large-Scale Named Entity Disambiguation Based on Wikipedia Data. In Proceedings of EMNLP-CoNLL 2007, pp. 708-716.
Radu Florian, 2002. Named entity recognition as a house of cards: Classifier stacking. In Proceedings of CoNL2002, pp. 175-178.
Martin Jansche, 2002. Named Entity Extraction with Conditional Markov Models and Classifiers. In Proceedings of CoNLL-2002.
Thamar Solorio, 2004. Improvement of Named Entity Tagging by Machine Learning. Reporte Tecnico No. CCC-04-004. INAOE.
Canadian Office Action—CA Appl. 2,688,921—mailed Feb. 16, 2016.
Chen, Langzhou, et al. "Using information retrieval methods for language model adaptation." INTERSPEECH. 2001.
Sethy, Abhinav, Panayiotis G. Georgiou, and Shrikanth Narayanan. "Building topic specific language models from webdata using competitive models." INTERSPEECH. 2005.
Response to European Office Action—EP 10162666.1—Dated Oct. 14, 2015.
Response to European Office Action—EP Appl. 10154725.5—submitted Oct. 14, 2015.
European Office Action—EP Appl. 09815446.1—dated Feb. 17, 2016.
Response to European Office Action—EP Appl. 9180762.8—Submitted Jul. 29, 2015.
European Office Action—EP Appl. 10162666.1—dated Jul. 10, 2015.
Canadian Office Action—CA Appl. 2,703,569—dated Apr. 19, 2016.
Canadian Office Action—CA Appl. 2,708,842—dated May 9, 2016.
Canadian Office Action—CA App 2,695,709—dated Jun. 20, 2016.
Canadian Office Action—CA Appl. 2,694,943—dated Jun. 1, 2016.

* cited by examiner

IDENTIFICATION OF SEGMENTS WITHIN AUDIO, VIDEO, AND MULTIMEDIA ITEMS

FIELD OF THE INVENTION

The subject matter described herein pertains to methods, systems, and apparatus for identifying segments within a media item.

BACKGROUND OF THE INVENTION

Until fairly recently, individuals consumed audio, video, and other media content in relatively few forms (television, movies, musical albums) from relatively few sources (television stations, movie theaters, radio stations, CDs). However, with the advent of the Internet and an explosion in the availability of low cost electronic consumer products, the forms and potential sources of such content have become much more numerous. Today, individuals can consume such content via the internet on computers at home, on any number of portable devices with memory for storing content, on mobile devices with wireless network connectivity to content, on televisions, in movie theaters, etc. Furthermore, the potential sources of audio, video, and multimedia content are virtually limitless. For instance, subscription-based television network systems, such as cable television, now provide video on demand offerings in addition to standard broadcast television. They also allow subscribers to record broadcast television programs and watch them at a time of their own choosing and with the ability to control the content stream, such as by fast forward, skip, pause, rewind, etc.

Even further, almost anyone with a computer can now create and widely publish their own audio, video, and multimedia content on the Internet through such outlets as podcasts, videos published to the Internet via websites such as myspace.com and youtube.com. Accordingly, both the amount of available content and the specificity of the content has increased dramatically.

As both the volume and specificity of audio, video, and other media content increase, it is expected that consumers will increasingly consume such content, including television programs, movies, music videos, podcasts, musical albums, and other audio, video, and media assets at the sub-asset level. That is, for instance, rather than watching an entire baseball game, a consumer may watch only the parts where the team that he roots for is at bat or may only watch a highlight reel of the game. In another example, a viewer may view only the light saber fight scenes from the Star Wars movie series. In yet other examples, a viewer may watch only the sports segment or the weather segment of the evening news program or listen to only a single song from a CD album.

Presently, the only way a consumer of media content can access a segment of particular interest to that consumer within a media asset is to scan through the asset in a linear fashion, such as by using a fast-forward or rewind function of a media player, to find the desired content.

The decision as to which segments within a media item any individual wishes to view, of course, is based on the subject matter of the content of the segment. "Media" refers to the forms in which content may be transmitted. Presently, the most common transmitted media are audio (e.g., music, speech) and visual (photographs, drawings, motion pictures, web pages, animation). These media are typically represented in electronic formats, such as, for example, HTTP, NNTP, UDP, JMS, TCP, MPEG, MP3, wave files, HTML, JPEG, TIFF, and PDF. As transmission technologies become more advanced, however, transmitted media will likely involve other sensory data such as taste, smell and touch.

Furthermore, as is well-known, advertisers often purchase advertisement time or space within media segments, such as television programs, radio programs, web pages, podcasts, etc. based on the subject matter of the media. Specifically, advertisers commonly are interested in a particular demographic of media consumers that can range from the very broad to the extremely narrow. For instance, a producer of beer might be interested in a demographic of male media consumers aged 18-45, whereas a producer of anti-aging face cream for women might be interested in a demographic comprising female media consumers aged 30-70. The subject matter of a media segment often has a very high correlation to a specific demographic. Therefore, the producer of anti-aging face cream may be much more interested in placing its advertisement in a soap opera rather than a football competition, because the soap opera will be viewed by many more individuals within the demographic that is likely to buy its product than the football competition, even if the football competition has a much larger overall viewing audience than the soap opera.

Thus, not only do individuals expend a significant amount of effort selecting which media they consume, but a great deal of effort is expended by media content providers (e.g., individual radio and television stations, cable, fiber optic and satellite subscription-based television and radio network operators, internet service providers), media content creators (television and radio program producers, podcasters, Web-site operators), and advertisers in determining what subject matters of such media appeal to particular demographics for advertisement placement and other purposes.

SUMMARY OF THE INVENTION

The invention pertains to methods, systems, and apparatus for identifying segments within a media item, the media segment including at least one of audio content and video content, comprising segmenting the media item into a plurality of segments as a function of subject matter, storing data identifying each segment and its subject matter, and organizing each segment within an ontology based on its subject matter.

DETAILED DESCRIPTION OF THE INVENTION

Figure 1:
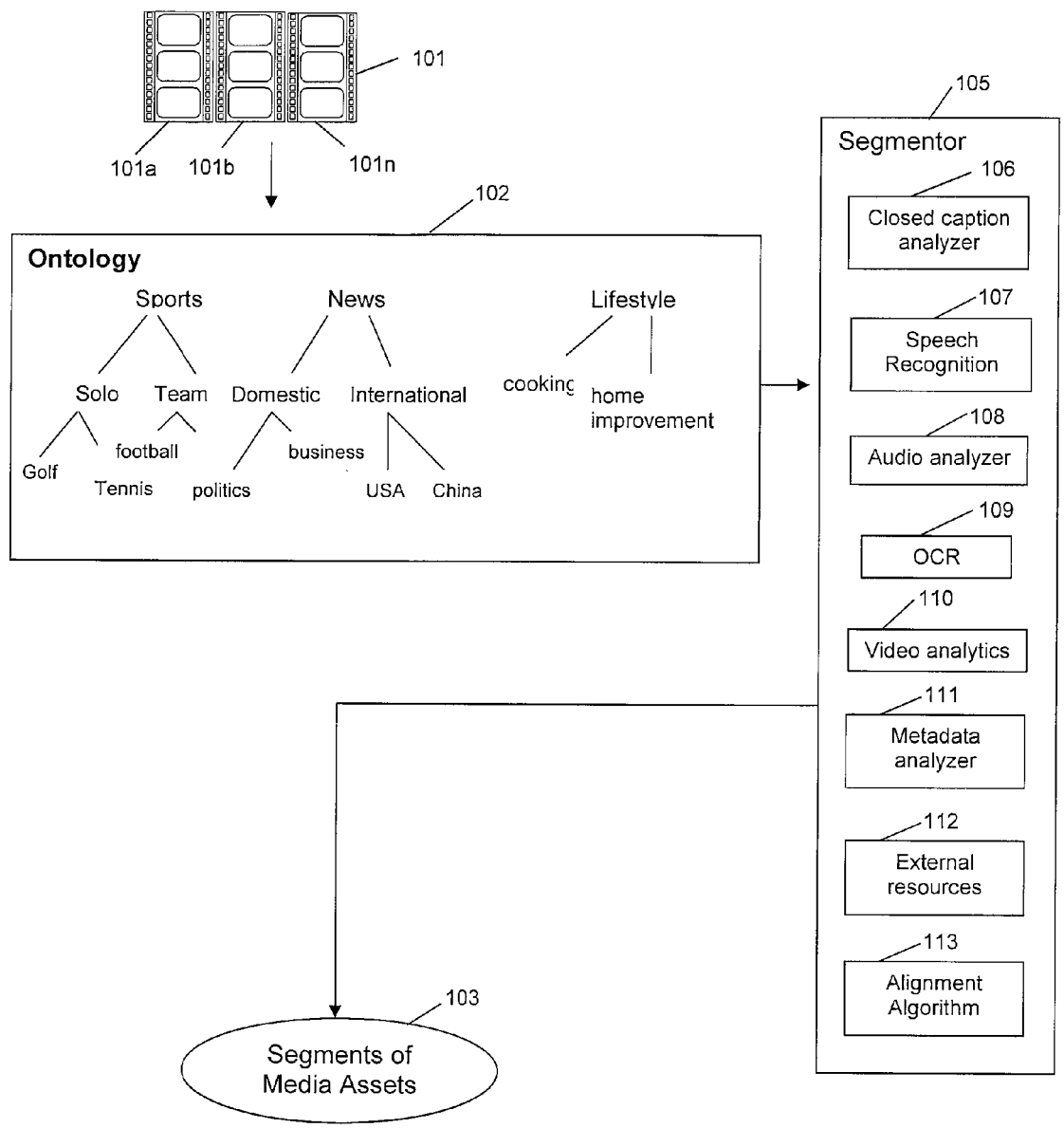
FIG. 1 is a diagram illustrating conceptual components of a system in accordance with an embodiment of the present invention.

The invention provides a system, including a method and an apparatus for identifying cohesive segments within media content, such as internet web pages, radio programs, podcasts, videos, music songs, and television programs. This task includes both identifying the boundaries of contextually cohesive segments as well as the subject matter of the segments. "Content" refers broadly to the information contained in the signal transmitted, and includes, for example, entertainment, news, and commercials. "Subject matter" or "contextual information" refers broadly to the topic or theme of the content and can be virtually anything within the realm of human knowledge, such as baseball, strike out, fast ball, stolen base, mountains, scary, happy, George Carlin, nighttime, cool winner.

The invention may comprise, utilize, and/or be incorporated within a number of technologies and components, some examples of which are the subject of co-pending patent applications owned by the same assignee as the present application, including U.S. patent application Ser. No. 12/343,786, filed on Dec. 24, 2008, and entitled Method and Apparatus for Advertising at the Sub-Asset Level; U.S. patent application Ser. No. 12/343,790, filed on Dec. 24, 2008, and entitled "Method and Apparatus for Organizing Segments of Media Assets and Determining Relevance of Segments to a Query"; and U.S. patent application Ser. No. 12/274,452, filed on Nov. 20, 2008, and entitled "Method and Apparatus for Delivering Video and Video-Related Content at Sub-Asset Level" are all incorporated herein fully by reference. These patent applications disclose systems that may incorporate the present invention, technologies that can be used in conjunction with the present invention in a larger system, and/or technologies that may be used to implement portions of a system incorporating the present invention. However, they are merely exemplary implementations and not limiting, and do not necessarily comprise a component of the present invention.

Media content typically is offered by their creators or providers, e.g., television stations and subscription-based television network operators (e.g., cable, fiber optic and satellite television network operators, internet service providers, telephone-based television network operator, wireless network operators, web site operators, radio and television stations, podcasters) in generally predefined portions, commonly termed in the related industries as "assets". For instance, television programs such as dramas, soap operas, reality shows, and situational comedies (sitcoms) typically are distributed in units known as episodes that commonly are a half hour or an hour in length (including advertisements). Sporting events typically are distributed (via radio, television, podcast, etc.) in units of a single game. Music videos are commonly distributed in portions corresponding to a complete song or a complete, albeit edited, concert performance.

In the television arts, professionals on the business side of the art tend to refer to these as "assets," whereas professionals working on the research and technology side of the art more often referred to them as "documents." In either event, the concept of a media "asset" or "document" is well understood in the industry as well as among ordinary consumers of audio, video, and multimedia content (who may not necessarily know the term "asset" or "document," but know the concept). For instance, a typical television guide printed in a newspaper or an electronic program guides commonly provided by a subscriber-based television network generally list media content at the asset level and are well known to virtually all television viewers.

In any event, any media item (be it a complete asset, a collection of multiple assets, a sub-asset level item, or a piece of content that cannot readily be defined in relation to the concept of a media asset) typically can conceptually be broken down into a plurality of segments, each having a cohesive subject or theme.

"Media" refers to the forms in which content may be transmitted. Presently, the most common transmitted media are audio (e.g., music, speech) and visual (photographs, drawings, motion pictures, web pages, animation). These media are typically represented in electronic formats, such as, for example, HTTP, NNTP, UDP, JMS, TCP, MPEG, MP3, wave files, HTML, JPEG, TIFF, and PDF. As transmission technologies become more advanced, however, transmitted media will likely involve other sensory data such as taste, smell and touch.

How the media items are segmented will depend on the processes used to determine contextually cohesive segments and the particular method for classifying the subject matters of the segments. An ontology may be developed for the purpose of classifying media segments and representing the various types of relationships that may exist between different subject matters. An ontology essentially is a is a formal representation of a set of concepts within a domain and the relationships between those concepts. It is used to reason about the properties of that domain, and may be used to define the domain. Key elements of an ontology include:

Classes: sets, collections, concepts, types of objects, or kinds of things

Attributes: aspects, properties, features, characteristics, or parameters that objects (and classes) can have Relations: ways in which classes and individuals can be related to one another Restrictions: formally stated descriptions of what must be true in order for some assertion to be accepted as input Rules: statements in the form of an if-then (antecedent-consequent) sentence that describe the logical inferences that can be drawn from an assertion in a particular form Thus, for instance, "an interception is a turnover" is a relationship. Also, "an interception may happen on a tipped pass" also is a relationship. An example of a restriction is "non-eligible receivers can catch a pass only if it is tipped by a defender". An example of a rule is "plays involving ineligible receivers may be near interceptions" and, therefore, may be closely related to an interception.

The nature and duration of each segment will depend, of course, on the particular ontology used for purposes of segmentation as well as on the particular content of each program. For instance, most stage plays, and motion pictures readily break down into two or three acts, each act comprising a plurality of scenes. Each such act or scene can be a different cohesive segment. Television programs also can be segmented according to thematic elements. Certain programs, for instance, the television news magazine program "60 Minutes" can readily be segmented into different news stories. Other programs, however, can be segmented based on more subtle thematic elements. A baseball game can be segmented by innings, half-innings, or individual at-bats, for instance. A football game can be segmented by halves, quarters, team drives, or individual downs. A typical "James Bond" movie can be segmented into a plurality of action segments, a plurality of dramatic segments, and a plurality romantic segments. The possibilities for segmentation based on thematic elements is virtually limitless and the above examples are only the simplest of examples.

It is foreseen that the ability to partition media assets into contextually cohesive segments by subject matter in an automated fashion and to index them such that they are searchable either via automated search techniques or human searching has tremendous potential to increase the viewing pleasure of consumers of media assets. It also is likely to increase advertising revenue to the providers of such media content by permitting advertisers to purchase advertising airtime or space at a more specific segment level rather than merely at the asset level. Particularly, the ability to identify contextually cohesive segments and their subject matter within a larger multimedia asset likely will attract more advertisers and/or increase the value of a particular advertisement. Consequently, the content provider or creator should, in theory, be able to charge a higher price for advertising space at the segment level than at the asset level. Aforementioned U.S. patent application Ser. No. 12/343,786 addresses this topic.

FIG. 1 is a block diagram illustrating conceptually the components of a system 100 incorporating the present invention. It will be understood by those of skill in the related arts that, in a practical embodiment, the components illustrated in FIG. 1 would likely be implemented by software, digital memory, and computer processing equipment. The software and/or other circuits may be distributed amongst different nodes of the network, such as a server and a client node. Also, the software may be embodied in any form of memory that can be associated with a digital processing apparatus, including, but not limited to RAM, ROM, PROM, EPROM, EEPROM, DRAM, Compact Disc, Tape, Floppy Disc, DVD, SD memory devices, Compact Flash memory devices, USB memory devices, etc.

A collection of media items 101 comprising files 101a, 101b, . . . , 101n exists that can be segmented into smaller, contextually coherent segments, e.g., at the sub-asset level. The segments will be maintained in a segment database 103 that identifies the segments and their subject matter. The identification data for each segment may include, for instance, the identification of the media item (e.g., asset) of which it forms a part and the time indexes within the item of the start and end times of the segment. The subject matter information may comprise virtually any information relating to the subject matter of the segment.

The subject matter information in the segment database 103 for each segment may be represented using a variety of data models, the most basic forms being a plurality of attribute/value pairs or a flat (table) database model of tuples (an ordered list of values). More complex models could include hierarchical or relational data models. Thus, using as an example, a segment comprising a single down (the segment) in a football competition (the asset) and using an attribute/value pair data model, one of the attributes may be "Key Offensive Players" and its value would be assigned the names (or other identification indicia) of the primary offense team players involved in the play. For instance, if the play is a passing play, the "Key Offensive Players" attribute value might be filled in with the identification of the receiver for whom the past was intended, the quarterback that threw the pass, and, if applicable, an offensive team player that threw an important block.

The number of attributes and the specific attributes for any given segment can differ as a function of the particular knowledge domain of the asset from which the segment is taken. More specifically, as will be described in greater detail hereinbelow, the particular pieces of subject matter information (e.g., attribute/value pairs) maintained in the database is specific to the knowledge domain of the asset. Preferably, the specific knowledge domain is selected as a function of the domain of the media item that is being segmented. For instance, the attributes stored in connection with a segment that forms part of an asset that is a football game may be different than the attributes that are stored for a segment that is part of a baseball game, which are even further different than the attributes that are stored in connection with a segment that is part of a program about cooking.

Generally, the larger subject matter (or knowledge domain) of most assets is either known in advance of any subject matter analysis of the asset, e.g., from the title of the asset, or is easily determinable via an initial subject matter analysis. As used herein, "knowledge domain" refers to a relatively broad category of subject matter, such as baseball, football, romance, Spanish, music, medicine, law, comedy. The breadth and subject of any knowledge domain is entirely within the discretion of its creator. The only requirement is that a knowledge domain have sub-categories.

The knowledge domain of the asset may be input to the system manually by a human operator. Alternately, it may be derived by simple analysis of the title of the asset. This can be done, for instance, by keyword analysis within the title or by comparing the title against a database of known program titles correlated to their knowledge domains. In any event, once the knowledge domain of the asset is determined (e.g., football, baseball, sitcom, reality show, reality competition, game show, law drama, crime drama, medical drama, etc.), the specific pieces of information determined and stored with respect to a segment (e.g., the attribute/value pairs stored in the segment database 103) can be customized as a function of the specific knowledge domain of the asset of which it forms a part.

Thus, for instance, continuing with the football game example, the attributes for individual down segments of a football game may include Team On Offense, Team On Defense, Game Time, Down Number, Key Offensive Players, Key Defensive Players, Type of Play (e.g., kick off, point after attempt, punt, regular play), Yards Gained/Lost, etc.

On the other hand, the attributes for segments forming a portion of a baseball game may be substantially different. Merely as an example, the segmentation of a baseball competition may be done at the at-bat level and the attributes for each at-bat (i.e., segment) may comprise Date/Time of the At-Bat, Team On Offense, Team On Defense, Inning Number, Batter, Players on Field and their Positions, the Result of the At-Bat (in the manner of baseball scorekeeping).

In short, the attributes that are to be stored in the database for a given segment will differ depending on the knowledge domain of the media item (e.g., asset) from which the segment is taken. Specialized attribute sets may be designed for the most common, relevant, or popular knowledge domains for the given population of media assets to be segmented. A default attribute set may be used for assets that do not fall within one of the specialized attribute sets or assets the knowledge domain of which cannot be determined.

Thus, in a preferred embodiment, a segmentor 105 having a plurality of different subject matter information gathering processes 106-113 is utilized to determine the boundaries and subject matter of cohesive segments of the media assets 101.

The process of identifying contextually cohesive segments of media items has at least two parts; namely, (1) identifying cohesive, meaningful segments within media items (e.g., identifying the beginning and end of a meaningful segment having a cohesive theme or subject matter) and (2) identifying that subject matter. Particularly, identifying keywords or other thematic elements in a multimedia file in order to identify subject matter is part of the task. Automatically delimiting the segments, i.e., determining the boundaries (beginning and end) of a segment having a cohesive subject matter, is an additional complexity.

Various technologies, generally represented within segmentor 105 in FIG. 1, may be utilized to determine the subject matter of portions of media items, such as assets, and partition them into coherent segments as a function of their subject matter.

Many technologies are available now that can be adapted for use for identifying media segments either as stand-alone components or in combination within the present invention. For instance, software 106 is now available that can capture the closed caption stream within a media asset and analyze it for subject matter. Further, software 107 is available that can analyze the audio portion of a media stream and detect speech within the audio stream and convert the speech to text (which can further be analyzed for subject matter just like the close-caption stream).

In fact, voice recognition software can be used to detect the identity of a particular speaker within a media stream. For instance, certain types of media files, such as television programs of a particular title (e.g., "60 Minutes" or "Seinfeld") have a known set of individuals that are likely to speak during the program. In 60 Minutes, for instance, it would be the handful of reporters that regularly host segments of the program. In "Seinfeld", it would be one of the handful of main characters—Jerry Seinfeld (played by actor Jerry Seinfeld), Elaine Benes played by actor Julia Louis-Dreyfus), Cosmo Kramer (played by actor Michael Richards), and George Costanza (played by actor Jason Alexander). Such software can be pre-programmed to recognize the voices of those main characters/actors and then used to recognize those voices to provide even richer subject matter data.

Additionally, audio analytics software 108 is now available that can analyze the non-speech aspects of the audio stream of an audio or multimedia file to determine additional contextual information from sounds other than speech. For instance, such software can detect, recognize, and distinguish between, e.g., the sound of a crowd cheering or booing, sounds associated with being outdoors in a natural setting or being outdoors in an urban setting, or being indoors in a factory or an office or a residence, etc. For example, U.S. Pat. No. 7,177,881 discloses suitable software for detecting semantic events in an audio stream.

Even further, optical character recognition software 109 can be used to determine text that appears in a scene. See, e.g. Li, Y. et al. "Reliable Video Clock Recognition," Pattern Recognition, 2006, 1CPR 2006, 18th International Conference on Pattern Recognition. Such software can be used, for instance, to detect the clock in a timed sporting event. Specifically, knowledge of the game time could be useful in helping determine the nature of a scene. For instance, whether the clock is running or not could be informative as to whether the ball is in play during a football game. Furthermore, certain times during a sporting event are particularly important, such as two minutes before the end of a professional football game. Likewise, optical character recognition can be used to determine the names of the actors, characters, and/or other significant persons in a television program or the like simply by reading the credits at the beginning and/or end of the program.

Furthermore, video analytics software 110 is available that can analyze other visual content of a video or multimedia stream to determine contextual information, e.g., indoors or outdoors, presence or absence of cars and other vehicles, presence or absence of human beings, presence or absence of non-human animals, etc. In fact, software is available today that can be used to actually recognize specific individuals by analyzing their faces.

Even further, there may be significant metadata contained in a media stream. While a closed captioning stream may be considered metadata, we here refer to additional information. Particularly, the makers or distributors of television programs or third party providers sometimes insert metadata into the stream that might be useful in determining the subject matter of a program or of a segment within a program. Such metadata may include almost any relevant information, such as actors in a scene, timestamps identifying the beginnings and ends of various portions of a program, the names of the teams in a sporting event, the date and time that the sports event actually occurred, the number of the game within a complete season, etc. Accordingly, the technology 105 also may include software 111 for analyzing such metadata.

Even further, companies now exist that provide the services of generating and selling data about sporting events, television programs, and other events. For instance, Stats, Inc. of Northbrook, Ill., USA sells such metadata about sporting events. Thus, taking a baseball game as an example, the data may include, for instance, the time that each half inning commenced and ended, data for each at bat during the game, such as the identity of the batter, the result of the at-bat, the times at which the at-bat commenced and ended, the statistics of each player in the game, the score of the game at any given instance, the teams playing the game, etc. Accordingly, another software module 112 can be provided to analyze data obtained from external sources, such as Stats, Inc.

Furthermore, the aforementioned optical character recognition (OCR) of the game clock in a sporting event also would be very useful in terms of aligning the game time with the media stream time. For instance, external data available from sources such as Stats, Inc. includes data disclosing the time during the game that certain events (e.g., plays) occurred, but generally does not contain any information correlating the game time to the media stream time index. Thus, an alignment algorithm 113 for correlating game time with data stream time also may be a useful software component for purposes of identifying cohesive segments in connection with at least certain types of multimedia content, such as timed sports competitions.

External data also is widely available free of charge. For instance, additional contextual information may be obtained via the Internet. Particularly, much information about sporting events, music, and television shows is widely available on the Internet from any number of free sources. For instance, synopses of episodes of many television shows are widely available on the Internet, including character and actor lists, dates of first airing, episode numbers in the sequence of episodes, etc. Even further, detailed text information about live sporting events is often available on the Internet in almost real time.

The present invention may rely on any or all of these techniques for determining the subject matter of a media item as well as the beginning and end of coherent segments corresponding to a particular subject matter. Also, as previously noted, different contextual information gathering processes for different knowledge domains may use different sets of these tools and/or use them in different ways or combinations. Furthermore, as previously mentioned, the same technologies in segmentor 105 may be used to determine the knowledge domains (i.e., the more general subject matter) of assets in embodiments in which such information is not predetermined so that the system can choose the particular set of technologies and particular subject matter data sets adapted to that knowledge domain for carrying out the segmentation.

It also should be noted that the classification within the ontology of media items need not be exclusive. For instance, a given segment may be properly assigned two or more relatively disparate subject matters within the ontology. For instance, a television program on the History Channel having a portion pertaining to the origination of the sport of golf in Scotland may be classified as pertaining to all of (1) history, (2) travel, and (3) sports.

It should be understood, that the example above is simplified for purposes of illustrating the proposition being discussed. In actuality, of course, a segment about the history and origins of golf in Scotland would be classified and sub-classified to multiple levels according to an ontology 102.

In a computer memory, it can be stored as a data structure. In fact, typically, an ontology is developed first in order to structure such a database 101. For instance, in a robust ontology, this segment would not be merely classified under history, but probably would be further sub-classified under European history, and even further sub-classified under Scottish history, etc. It would further be classified not merely under travel, but probably under travel, then sub-classified under European travel, and then even further sub-classified under Scottish travel, etc. Finally, it also would not merely be classified under sports, but, for instance, under sports and further sub-classified under solo sports, and even further sub-classified under golf.

It also should be understood that the "context" being referred to in the terms "contextual information" and "contextually cohesive" is the ontology (within which the subject matter of the content will be classified), i.e., the location of the subject matter within the (context of the) ontology.

Furthermore, segmentation need not necessarily be discrete. Segments also may overlap. For instance, the same show on the History Channel mentioned above may start with a segment on Scottish history that evolves into a segment on the origins of golf and that even further morphs into a segment on Scottish dance music. Accordingly, a first segment may be defined as starting at timestamp 5 minutes:11 seconds in the program and ending at timestamp 9 m:18 s classified under History: European: Scotland. A second segment starting at 7 m:39 s and ending at 11 m:52 s may be classified under Sports: Golf and a third segment starting at 11 m:13 s and ending at 14 m:09 s may be classified under Music: Dance: Scottish. In this example, the various segments overlap each other in time.

Even further, a segment may be of any length, including zero (i.e., it is a single instant in time within the media item).

The system operator may predetermine a plurality of contextual information gathering processes, each adapted to a knowledge domain that is particularly relevant, popular, or common among the assets within the operator's collection of assets. Alternatively or additionally, specialized contextual information gathering processes may be developed to correspond to popular interests among the expected users (target demographic) of the system (e.g., (1) subscribers of a television service network employing the system or (2) advertisers). A more generic, default information gathering process can be used for media items whose knowledge domain either cannot reasonably be determined or that do not fall into any of the other knowledge domain having customized processes.

For instance, if the present invention is to be implemented on a subscription-based television service network, then the plurality of knowledge domains to which the contextual information gathering processes and/or data models are customized should be specifically adapted for the types of media assets that commonly comprise television programming. For instance, the vast majority of network television programs fall in to one of a relatively small number of categories or domains. For instance, probably the vast majority of programs made for television fall into one of the following domains: news, situational comedies, law-based dramas, police-based dramas, medical-based dramas, reality TV, reality competitions, sports competitions (which might further be broken down into a handful of the most popular sports, such as football, hockey, baseball, basketball, soccer, golf), children's cartoons, daytime soap operas, educational, sketch comedy, talk shows, and game shows.

Hence, a specialized set of attributes and/or a specialized contextual information gathering process can be developed and used for each of these knowledge domains.

In any event, once the segments are determined and the contextual information has been gathered, the segments are then stored in the segment database 103 with all of the applicable attribute/value pairs (or other data model data).

It should be understood that the media items themselves do not necessarily need to be physically separated into distinct files at the segment level and stored in database 103. For instance, the database 103 may merely comprise information identifying the segments. In one embodiment, the segment database 103 may include links or pointers to the media items and time stamps indicating the start and end times within the item of the segment. The segments also are indexed within the ontology 102.

In one embodiment, the ontology 102 is particularly designed to provide a defined framework for classifying media segments by subject matter. The same type of customization discussed above with respect to the data sets and subject matter information gathering processes can be applied to the ontology so that each portion of the ontology under a particular knowledge domain is specifically designed as a function of that knowledge domain. As before, portions of the ontology may be specifically adapted to different knowledge domains corresponding to different types of media assets (e.g., baseball games, football games, cooking shows, sitcoms) and/or different specific interests of the expected viewing audience.

In at least one embodiment of the invention, all of the media items 101 are stored in a digital memory as digital files. The ontology 102 and the segment database 103 also are stored in a computer or other digital memory. The various contextual information gathering modules are preferably implemented as software routines running on a general or special purpose digital processing device, such as a computer. However, the processes also could be implemented in any of a number of other reasonable manners, including, but not limited to, integrated circuits, combinational logic circuits, field programmable gate arrays, analog circuitry, microprocessors, state machines, and/or combinations of any of the above.

It is envisioned that providers of media content, such as subscriber-based television networks, web sites, and radio stations, eventually will offer all or most of the media assets to their subscribers/patrons on an on-demand basis (i.e., a subscriber can consume any media item at any time of his choosing, rather than having to wait for a particular broadcast time). It also is envisioned that consumers will increasingly wish to consume such media content at the sub-asset level. Thus, it is envisioned that subscriber-based television network service providers, web sites, etc., for example, will wish to provide search and/or browse functions that allow consumers to search for media content at the sub-asset level. Likewise, advertisers will be interested in buying advertising time within content at the sub-asset level based on the subject matter of the particular segment. Finally, the media provider itself may wish to provide a feature to its customers whereby a media consumer (e.g., television viewer) can press a button while viewing particular media content and be presented a user interface within which the consumer is given a menu of other content available on the network (preferably at the segment level) having similar or related subject matter.

Aforementioned U.S. patent application Ser. No. 12/274,452 discloses such a system.

The mere matching of attribute values or other subject matter information to a search or browse query often will not find all of the relevant content or the most relevant content. Particularly, depending on the particular user's interests, segments having very different values for a given attribute actually may be closely related depending on the user's mind set. As an example, a person interested in finding segments pertaining to cooking with the spice fenugreek may generate a search string with the word "fenugreek" in it. A conventional generic search and/or browse engine would likely return the segments in which one or more of the attribute/value pairs includes the word "fenugreek." However, in many instances, the user might actually have been interested in receiving segments relating to other spices within the same herbal family as fenugreek or that are commonly substituted for fenugreek in recipes. Indexing the segments according to an ontology that has been developed with robust knowledge of the particular domain of interest, (e.g., food or cooking) would be able to group such spices together under a particular category within the ontology. Thus, designing a search and/or browse engine that takes into account the degree of relatedness of segments in accordance with the structure of the ontology could provide much better results than a conventional search and/or browse engine that does not take into account the robust knowledge inherent in the knowledge domain specific portions of the ontology.

Thus, by designing the contextual information gathering processes 105, the ontology 102, and/or the attribute/value pairs for the segment database 103 specifically for a plurality of different knowledge domains based on an individualized robust knowledge of each such domain (e.g., cooking, football, sitcoms, law dramas), one can provide much richer and more robust search and retrieval functionality for users.

The ontology 102 can be continuously refined as types of media assets, products, services, demographics, etc. are developed or themselves become more refined.

Figure 2:
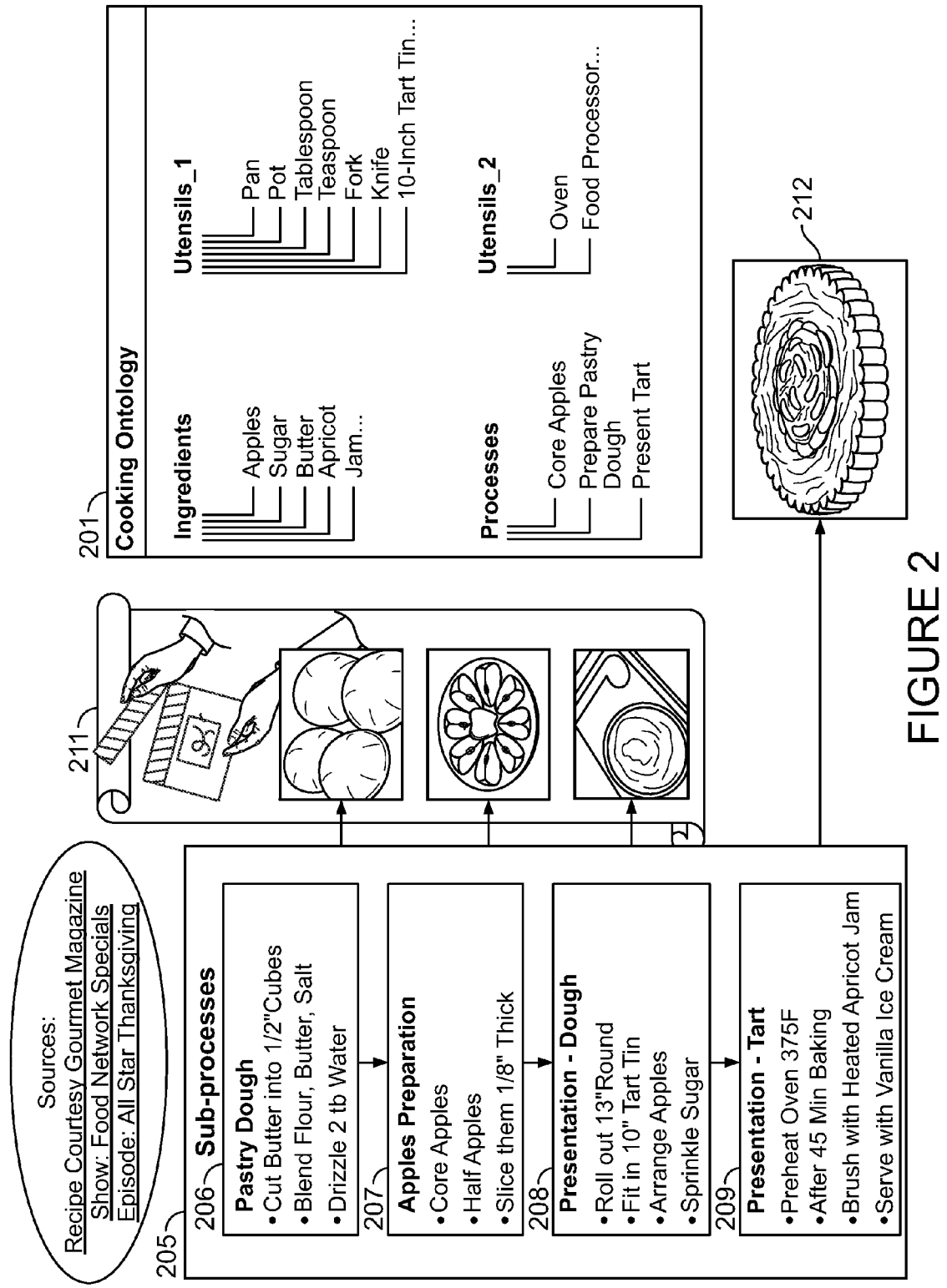
FIG. 2 is a diagram illustrating a potential application within which the present invention would have use.

FIG. 2 illustrates use of the invention in one possible practical application. In particular, it illustrates an application of the present invention to a multimedia asset comprising a half-hour cooking show in which the chef prepares an apple tart. It does not matter whether it is a program produced for television broadcast, a podcast, an internet video, a local access cable TV program, etc. The show may be readily segmented into a sequence of contextually coherent segments comprising preparation of different portions of the tart. For instance, the show 205 may be segmented into four coherent segments as follows: (1) preparation of the pastry dough 206, (2) preparation of the apples 207, (3) combination of the ingredients 208, and (4) cooking and serving of the tart 209.

The segmentation of the show and the classification of the segments within the ontology preferably are performed before or at the time the show was made available for viewing on demand.

Since this is a cooking show, the system will classify each segment within a portion of the ontology relating to cooking. Box 201 in FIG. 2 illustrates a simplified portion of the ontology pertaining to cooking. The cooking portion of the ontology comprises categories and subcategories particularly selected as a function of the particular knowledge domain of cooking. Thus, for instance, it includes categories for (1) ingredients 201a, (2) utensils for holding (e.g., pots, pans, spoons) 201b, (3) utensils for processing food (e.g., oven, stove, food processor, mixer, blender) 201c, and (4) processes 201d. Under each category may be any number of levels of sub-categories and any number of subcategories per level. For instance, under the category "Ingredients" (hereinafter the parent category), there may be sub-categories for apples, sugar, butter, apricot, jam, etc. (hereinafter the child category). Each of these child categories may have multiple grandchild categories. The possible levels and numbers of categories per level are virtually limitless. Box 201 illustrates only a small number of categories within which the segments of the show under consideration would fall for exemplary purposes. However, it will be understood that a robust ontology for the domain of cooking would likely have hundreds or even thousands of classifications and sub-classifications (most of which would not be relevant to this particular television program).

In any event, a user, such as a subscriber to a cable television network, a visitor to a web site, or a podcast consumer, may be permitted to select this particular television program 205 from a menu, such as a video on demand menu. Upon selecting this program, the user might be given the option of viewing the entire program in the normal, linear fashion or seeing a list of segments that are available for viewing individually. Should the user select to view the list of available segments, he or she may be presented with a list for segments 206-209 that are available for viewing, such as shown in box 205 of FIG. 2. Box 205 illustrates the segmentation presentation concept independent of any particular user interface. Nevertheless, the particular user interface actually could look somewhat like what is shown in box 205 in FIG. 2. Particularly, the user may be presented with a plurality of buttons 206, 207, 208, 209 which can be selected using a mouse, keyboard, remote control, or any other reasonable mechanism for interacting with the user interface). Each button preferably is labeled such as shown in FIG. 2 with a brief description of the subject matter of that segment. Pictures such as shown at 211 and 212 may be shown to help illustrate the topics of the segments.

Upon selecting one of the buttons, the media provider transmits the selected multimedia segment to the consumer. At the end of the segment, the consumer is returned to the user interface with the list of segments so that he or she may select the same segment or another segment for viewing next.

The indexing and presentation of the segments to the user as discussed above should greatly enhance both the enjoyment and the utility of the consumer's television experience.

Figure 3:
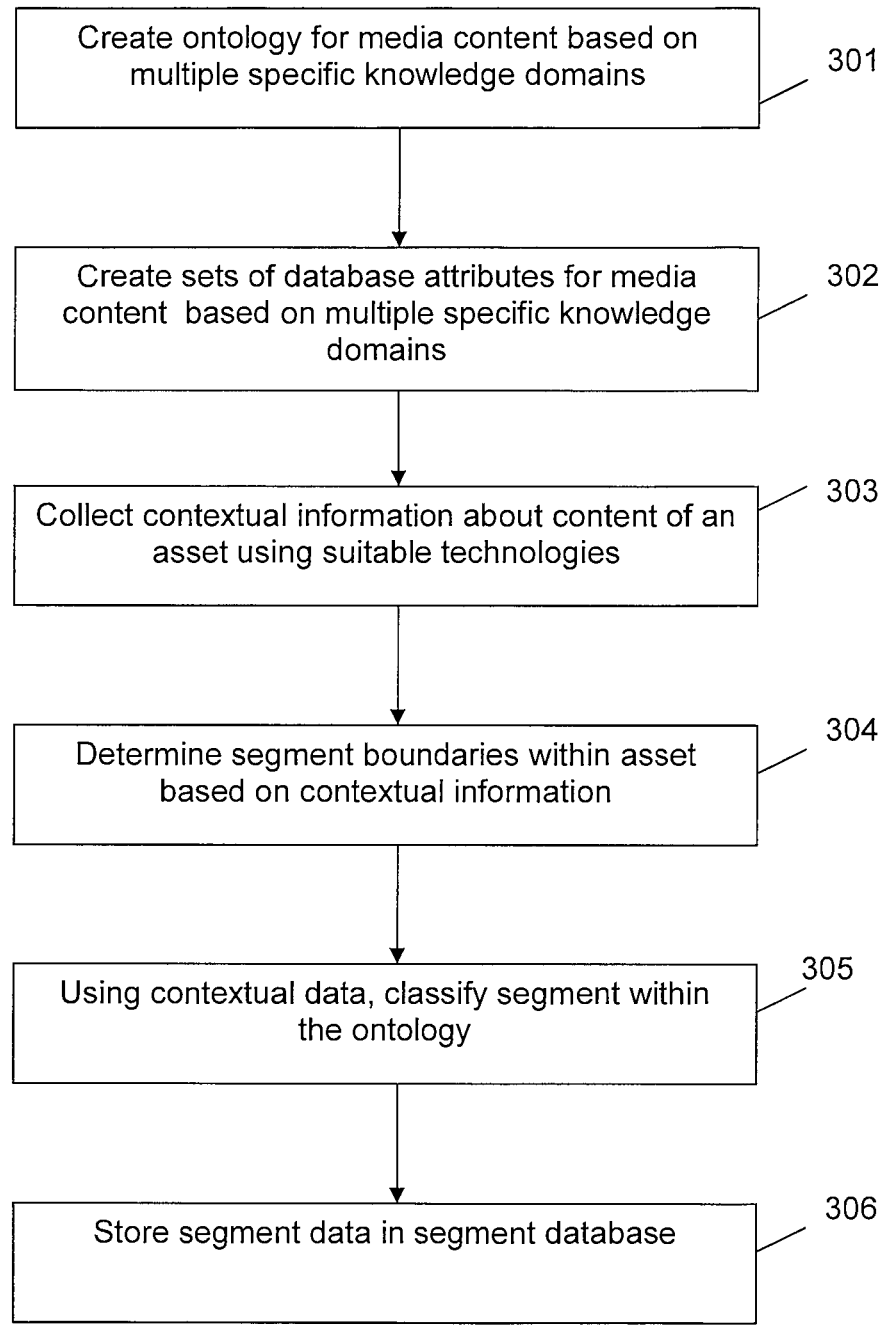
FIG. 3 is a flow diagram illustrating operation in accordance with the present invention.

FIG. 3 is a flowchart illustrating process flow in accordance with the principles of the present invention. In accordance with that flow, in step 301, an ontology is created specifically adapted for media content. In cases where a particular type of media content is likely to comprise a large portion of the content, the ontology should be specifically adapted to that type of content. For instance, a subscription-based television service provider would adapt its ontology for multimedia content, and specifically for the types of multimedia content that comprise typical television programming. On the other hand, a music service provider, e.g., an online radio station, might use a very different ontology specifically adapted for audio content, and more specifically music content.

Furthermore, within the overall ontology, preferably, different portions are specifically developed based on different knowledge domains. Again, using the cable television network service provider as an example, the ontology can have within it portions specifically adapted for sports games, cooking shows, situation comedies, reality shows, games shows, etc.

In any event, next in step 302, a database is designed to store suitable subject matter data about media segments. As was the case with the ontology, preferably, the database design also includes a plurality of different sets of attributes for media segments belonging to different knowledge domains.

Next, in step 303, media assets are analyzed using any or all of the various aforementioned technologies, including speech recognition analysis, OCR analysis, closed caption analysis, metadata analysis, audio analytics, video analytics, external data, etc., to extract subject matter data at the segment level within the media item. Next, in step 304, the boundaries of segments having particular cohesive subject matters are determined using the various aforementioned technologies. Although the flowchart shows steps 303 and 304 as separate steps, the process of determining the subject matter of segments and determining the boundaries of segments within media items having cohesive subject matters probably will be performed in conjunction.

Next, in step 305, the subject matter data that was collected in steps 303 and/or 304 is analyzed to classify the segment within the ontology and the ontological classification data is added to the dataset corresponding to the segment. Finally, in step 306, the segment data, including the segment boundaries, all of the relevant subject matter attribute/value pairs, and the ontological classification data, is stored in the segment database 103.

The segment is now ready to be searched for and retrieved in response to a search to which it is responsive.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method, comprising:
   analyzing, to determine one or more keywords, descriptive data of a media item;
   analyzing, by a computing device, the one or more keywords and selecting, based on the analyzing of the one or more keywords, a knowledge domain for the media item from a plurality of different knowledge domains;
   identifying, based on the knowledge domain, a plurality of attribute fields associated with the knowledge domain;
   identifying, from different combinations of media analysis technologies that correspond to the plurality of different knowledge domains and that are usable to analyze media, a combination of media analysis technologies corresponding to the knowledge domain;
   analyzing, after identifying the combination of media analysis technologies, the media item using the combination of media analysis technologies to determine values for the plurality of attribute fields; and
   segmenting the media item into a plurality of segments as a function of the values for the plurality of attribute fields by at least determining beginning and ending boundaries for the plurality of segments as a function of the values for the plurality of attribute fields.

2. The method of claim 1, wherein the media item comprises at least one of audio content or video content, wherein the combination of media analysis technologies comprises a first media analysis technology, and wherein analyzing the media item using the combination of media analysis technologies to determine the values for the plurality of attribute fields comprises:
   analyzing, using the first media analysis technology, the at least one of the audio content or the video content to determine one or more of the values for the plurality of attribute fields, wherein the plurality of attribute fields and the values for the plurality of attribute fields form a plurality of attribute/value pairs; and wherein the method further comprises:
   associating the plurality of attribute/value pairs with at least one of the plurality of segments.

3. The method of claim 2 further comprising obtaining, from an information source different from a source of the media item, information about the media item; and
   wherein segmenting the media item into the plurality of segments is performed as a function of the values for the plurality of attribute fields and the information about the media item.

4. The method of claim 1 further comprising:
   classifying each of the plurality of segments within an ontology, resulting in one or more classifications of each segment; and
   storing information identifying the plurality of segments to allow the plurality of segments to be found in future searches and storing information identifying the one or more classifications.

5. The method of claim 1 further comprising:
   storing information identifying the plurality of segments to allow the plurality of segments to be found in future searches; and
   performing, responsive to a search query, a search for segments based on the information identifying the plurality of segments.

6. The method of claim 1 wherein the media item comprises at least one of audio content or video content;
   wherein the combination of media analysis technologies comprises at least one of a closed captioning analytics technology, speech recognition technology, audio analytics technology for analyzing non-speech aspects of audio of the audio content, optical character recognition technology, video analytics technology, or metadata analytics technology; and
   wherein analyzing the media item using the combination of media analysis technologies to determine the values for the plurality of attribute fields comprises at least one of analyzing a closed captioning stream of the media item using the closed captioning analytics technology, analyzing the audio content of the media item for non-speech contextual information using the audio analytics technology, performing speech recognition on the audio content of the media item using the speech recognition technology, performing optical character recognition on the video content of the media item using the optical character recognition technology, performing video analytics on the video content of the media item using the video analytics technology, or analyzing metadata of the media item using the metadata analytics technology.

7. The method of claim 1 wherein the media item comprises multimedia assets of audio or video, and wherein the plurality of segments are sub-assets of the multimedia assets.

8. The method of claim 1 wherein the media item comprises television programming.

9. The method of claim 1, wherein the plurality of attribute fields is unique to the knowledge domain.

10. The method of claim 1, wherein the plurality of attribute fields comprises a set of knowledge domain specific media segmentation parameters that identify features to look for when segmenting media of the knowledge domain.

11. The method of claim 1, further comprising:
storing the values for the plurality of attribute fields to a database; and
storing the beginning and the ending boundaries for the plurality of segments to the database.

12. A method, comprising:
storing a first set of attribute fields defined for a first knowledge domain;
storing a second set of attribute fields defined for a second knowledge domain different from the first knowledge domain;
storing data describing a first gathering process that is specific to the first knowledge domain and that identifies a first combination of media analysis technologies to use when segmenting media of the first knowledge domain;
storing, by a computing device, data describing a second gathering process that is specific to the second knowledge domain and that identifies a second combination of media analysis technologies to use when segmenting media of the second knowledge domain, the second combination of media analysis technologies being different from the first combination of media analysis technologies;
analyzing, to determine one or more keywords, descriptive data of a media item;
analyzing the one or more keywords and selecting, based on the analysis of the one or more keywords, the first knowledge domain;
identifying, after the first knowledge domain is selected, the first set of attribute fields;
retrieving the data describing the first gathering process;
analyzing, after retrieving the data describing the first gathering process, the media item using the first combination of media analysis technologies to determine values for the first set of attribute fields; and
segmenting the media item into a plurality of segments as a function of the first gathering process and the values for the first set of attribute fields by at least determining beginning and ending boundaries for the plurality of segments as a function of the values for the first set of attribute fields.

13. The method of claim 12 further comprising:
analyzing, to determine one or more second keywords, descriptive data of a second media item;
analyzing the one or more second keywords and selecting, based on the analysis of the one or more second keywords, the second knowledge domain;
identifying, after the second knowledge domain is selected, the second set of attribute fields;
retrieving the data describing the second gathering process;
analyzing, after retrieving the data describing the second gathering process, the second media item using the second combination of media analysis technologies to determine values for the second set of attribute fields; and
segmenting the second media item into a second plurality of segments as a function of the second gathering process and the values for the second set of attribute fields by at least determining beginning and ending boundaries for the second plurality of segments as a function of the values for the second set of attribute fields.

14. The method of claim 13 wherein the first knowledge domain is a first type of sport, and the second knowledge domain is a second type of sport.

15. The method of claim 14 wherein the first set of attribute fields comprises at least one of the following: a team on offense attribute field, a team on defense attribute field, a game time attribute field, a down number attribute field, a key offensive players attribute field, a key defensive player attribute field, a type of play attribute field, or a yards gained attribute field; and
wherein the second set of attribute fields comprises at least one of the following: an inning number attribute field, a batter attribute field, or a result of at-bat attribute field.

16. The method of claim 12 wherein the media item comprises at least one of audio content or video content;
wherein the first combination of media analysis technologies comprises at least one of a closed captioning analytics technology, speech recognition technology, audio analytics technology for analyzing non-speech aspects of audio of the audio content, optical character recognition technology, video analytics technology, or metadata analytics technology; and
wherein analyzing the media item using the first combination of media analysis technologies to determine the values for the first set of attribute fields comprises at least one of analyzing a closed captioning stream of the media item using the closed captioning analytics technology, analyzing the audio content for non-speech contextual information using the audio analytics technology, performing speech recognition on the audio content using speech recognition technology, performing optical character recognition on the video content using the optical character recognition technology, performing video analytics on the video content using the video analytics technology, or analyzing metadata of the media item using the metadata analytics technology.

17. The method of claim 12, wherein the first combination of media analysis technologies comprises speech recognition technology, video analytics technology and metadata analytics technology, and
wherein the second combination of media analysis technologies comprises audio analytics technology for analyzing non-speech aspects of audio of the media item and optical character recognition technology.

18. The method of claim 12, further comprising:
storing the values for the first set of attribute fields to a database; and
storing the beginning and the ending boundaries for the plurality of segments to the database.

19. A method, comprising:
analyzing, to determine one or more keywords, descriptive data of a media item, the media item comprising video content;
analyzing, by a computing device, the one or more keywords and selecting, based on the analyzing of the one or more keywords, a knowledge domain for the media item from a plurality of different knowledge domains;
identifying, based on the knowledge domain, a plurality of attribute fields associated with the knowledge domain;
selecting, from different pre-defined combinations of media analysis technologies corresponding to the plurality of different knowledge domains, a pre-defined combination of media analysis technologies that corresponds to the knowledge domain and that comprises a first media analysis technology for analyzing the video content;
analyzing, after selecting the pre-defined combination of media analysis technologies, the media item using the pre-defined combination of media analysis technologies to determine values for the plurality of attribute fields by at least analyzing the video content of the media item using the first media analysis technology to determine one or more first values of the values for the plurality of attribute fields; and
segmenting the media item into a plurality of segments as a function of the values for the plurality of attribute fields by at least determining beginning and ending boundaries for the plurality of segments as a function of the values for the plurality of attribute fields.

20. The method of claim 19, wherein the media item comprises audio content;
wherein the pre-defined combination of media analysis technologies comprises a second media analysis technology for analyzing the audio content; and
wherein analyzing the media item using the pre-defined combination of media analysis technologies to determine the values for the plurality of attribute fields comprises analyzing the audio content using the second media analysis technology to determine one or more second values of the values for the plurality of attribute fields.

21. The method of claim 20, wherein the second media analysis technology is software for analyzing the audio content to determine an identity of a person speaking within the audio content, and wherein the one or more second values comprises the identity of the person speaking within the audio content.

22. The method of claim 20, wherein the second media analysis technology is software for analyzing the audio content to determine an occurrence of a particular type of sound within the audio content, and wherein the one or more second values comprises an indication of the occurrence of the particular type of sound.

23. The method of claim 19, wherein the media item comprises metadata;
wherein the pre-defined combination of media analysis technologies comprises a second media analysis technology for analyzing the metadata; and
wherein analyzing the media item using the pre-defined combination of media analysis technologies to determine the values for the plurality of attribute fields comprises analyzing the metadata using the second media analysis technology to determine one or more second values of the values for the plurality of attribute fields.

* * * * *

UNITED STATES PATENT AND TRADEMARK OFFICE
CERTIFICATE OF CORRECTION

PATENT NO. : 9,442,933 B2  Page 1 of 1
APPLICATION NO. : 12/343779
DATED : September 13, 2016
INVENTOR(S) : Tzoukermann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 841 days.

Signed and Sealed this
Twenty-fifth Day of September, 2018

Andrei Iancu
*Director of the United States Patent and Trademark Office*